Aug. 2, 1960  I. I. INCULET ET AL  2,947,892
VENTILATION OF TOTALLY ENCLOSED MOTORS
Filed Feb. 12, 1958
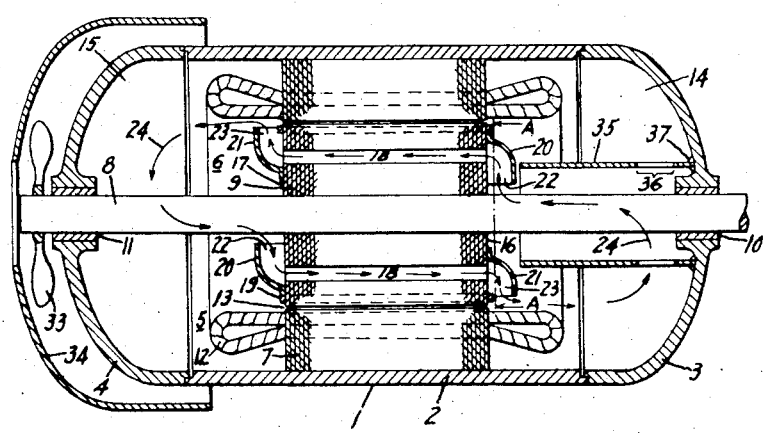
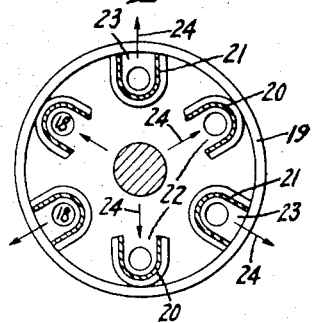
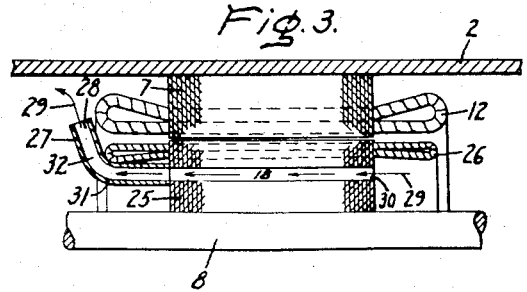
Inventors:
Ion I. Inculet,
Vaughn A. Taylor,
by James R. Campbell
Their Attorney.

2,947,892

VENTILATION OF TOTALLY ENCLOSED MOTORS

Ion I. Inculet, Quebec, Quebec, and Vaughn A. Taylor, Peterborough, Ontario, Canada, assignors to Canadian General Electric Company, Limited, Toronto, Ontario, Canada, a company incorporated in Canada Filed Feb. 12, 1958, Ser. No. 714,824

1 Claim. (Cl. 310—57)

The invention described herein relates to totally enclosed dynamoelectric machines, and more particularly to the cooling of the rotating element arranged for electrodynamic cooperation with a stator.

The complete enclosing of stationary and rotating elements in a dynamoelectric machine requires that heat generated in each must be conducted through the enclosure walls and dissipated therefrom to the surrounding atmosphere. In a machine such as a total enclosed alternating current induction motor, it is common practice to place the stator within the enclosure so that the outer surface of its magnetic core is in intimate surface engagement with the inner surface of the enclosure. Such an arrangement of stator and enclosure permits the heat generated in the stator to be conduced to the enclosure and passed therefrom to the surrounding atmosphere. Heat generated in the rotor however, may be either transferred to the stator or directly to the enclosure. The gap provided between the cores of the rotor and stator tends to impede the transfer of heat from one to the other, and in order to effectively transfer heat from the rotor to the stator, the former must operate at a substantially higher temperature than the latter. Operation of the rotor at elevated temperatures in undesirable because of the detrimental effects to component parts of the rotor and also, because the temperature rise of the stator in the vicinity of the gap and winding reaches values greater than that for which the machine is designed.

Some of the heat generated in the rotor may be transferred directly to the enclosure by air movement caused by mere rotation of the rotor body or by fans mounted for rotation therewith. Since the gap between the rotor and stator generally retards the free passage of heat thereacross, present practices for cooling the rotor are almost entirely limited to the circulation of air adjacent the rotor ends. The manner in which the laminations are stacked to form the rotor core is such that heat conduction is more effective in a radial direction than in an axial direction since a heat barrier is established in the form of a thin layer of insulation between the rotor laminations. It is thus seen that the heat generated within the rotor core is not readily transferred to the ends of the core. Although it is very difficult to obtain adequate cooling of both the stator and rotor in a totally enclosed motor, the rotor in particular presents problems of greater magnitude.

When designing a totally enclosed motor, it is very important that the operating temperature of the rotor be fully considered. The permissible temperature rise within the rotor may be a factor which will limit the physical size of rotor for a given horsepower rating. If a larger rotor is necessary in order to obtain adequate cooling, it is obvious that a larger stator and frame are also necessary. This may result in a machine which is larger physically than otherwise necessary.

It is the object of this invention, therefore, to provide a means for cooling the rotor of a totally enclosed dynamoelectric machine by forcing the air or other cooling medium within the enclosure to circulate through passages in the rotor, the passages being preferably situated in the region where the heat is normally generated.

In one aspect of the invention, the stator and rotor divide the enclosure into a pair of chambers, one at each end of the rotor. An even number of uniformly spaced ducts pass axially through the rotor from end to end thereof and thus provide communication between the chambers. Each axial duct terminates in a pocket on opposite ends of the rotor, wherein the opening of one pocket is directed radially outwardly while the opening in the other pocket is directed radially inwardly. Further, the pocket openings on opposite ends of the rotor alternate between outward and inward positions, so that upon rotation of the rotor, the pockets act as impellers to force the air or other cooling medium to circulate through the ducts between the chambers and in heat exchange relationship with the enclosure for transferring heat thereto for dissipation to the atmosphere.

While the specification concludes with claim particularly pointing out and distinctly claiming the subject matter which we regard as our invention, it is believed the invention will be better understood from the following description taken in connection with the accompanying drawing in which:

Figure 1 is a longitudinal sectional view of a totally enclosed alternating current induction motor showing a pair of air ducts in the rotor and the arrangement of the pockets associated with each duct.

Figure 2 is a sectional view of Figure 1 taken along line A—A showing the arrangement of ducts and pockets, at one end of the rotor.

Figure 3 illustrates a modified arrangement of duct and pocket where the duct extends beyond the end of the rotor core.

Referring now to the drawing wherein like reference characters designate like or corresponding parts throughout the several views, there is shown in Figure 1, an alternating current induction motor 1 having a frame member 2 and a pair of end shields 3 and 4 totally enclosing a stator 5 and rotor 6. The rotor 6 is rotatable in a pair of aligned bearings 10 and 11 fitted into central apertures in the end shields 3 and 4 respectively. A rotor core 9 centrally positioned within the stator core 7 but spaced radially therefrom is mounted on the shaft 8 for rotation therewith.

The stator 5 comprises a laminated core 7 of ferromagnetic material disposed within frame member 2 such that the outer peripheral edge of each lamination is in intimate metal-to-metal contact with the frame to provide a relatively low resistance path for conducting the heat from core 7 to the frame member 2. A winding 12 is embedded in longitudinal slots of the stator core in the usual manner. It is apparent that heat generated in either winding 12 or core 7 will be readily conducted to the frame 2 and dissipated therefrom as by radiation or conduction to the surrounding air while heat generated in the rotor core 9 cannot be readily transferred to the stator core because the two cores are separated by a radial gap 13.

The rotor core 9 comprises a stack of disk shaped laminations of ferromagnetic material attached to shaft 8 by well known means. As illustrated in Figure 1, the rotor is provided with a squirrel cage winding 19 although it is to be understood that the invention is equally applicable to other forms of rotating members, such as wound rotor motors.

Since the gap 13 is very small, it will be seen that the cores 7 and 9 divide or partition the enclosure defined by elements 2, 3 and 4 so as to provide a pair of chambers 14 and 15, one at each of the ends 16 and 17 respectively of the rotor core. These chambers may be filled with air or some other fluid cooling medium such as an inert gas which when circulated within the chamber, will transfer heat from the rotor or stator to the inner surface of end shields 3 and 4. The surface area of an end shield is relatively great thus providing an effective means of dissipating the heat transferred thereto by the cooling medium.

In order to effectively utilize the above means for cooling the rotor 6, this invention provides two or more passages or ducts 18 which pass through the rotor core 9 such that the cooling medium may pass freely from one chamber to the other. Ducts 18, preferably two in number or a multiple thereof, are equally spaced relative to each other and relative to shaft 8 and pass through the rotor core from end 16 to end 17 thereof. Figure 2 illustrates an arrangement of six such ducts which are equally spaced from the shaft 8 and equally spaced around the periphery of core 9. The ducts may pass through the rotor core parallel to shaft 8 as shown in Figure 1 or they may follow a course from end 16 to 17 which is not parallel to shaft 8, if desired. Although most efficient cooling of the rotor is obtained when the ducts 18 pass through the regions where the heat is generated, their location in core 9 will be determined mainly by the location of winding 19 and the magnetic circuit in the rotor. Preferably, apertures will be formed in the laminations when the lamination itself is formed, and the alignment of these apertures will define duct 18 in the assembled core 9. The ducts 18 may be circular in section as shown in the drawings or of any other desired shape.

The cooling medium within chamber 14 may be made to pass through certain ducts 18 into chamber 15 and back again through other ducts 18 by providing a pair of pockets 20 and 21 for each duct of the type illustrated in Figures 1 and 2. Each end of a duct 18 terminates in the bottom end of an elongated cup-shaped pocket which is open at the other or top end as at 22 or 23. Each pocket is therefore in communication with a duct 18 and also in communication with one of the chambers 14 or 15. Pockets 20 and 21 are arranged such that the open end 22 of pocket 20 is directed radially inwardly while the open end 23 of pocket 21 is directed radially outwardly.

During rotation of the rotor, the cooling medium within pockets 20 and 21 will be impelled in a radial direction by centrifugal force away from the axis of rotation and thereby cause a flow of the medium through the ducts 18 in the direction shown by arrows 24. Figure 2 illustrates an arrangement of six ducts 18 and three each of pockets 20 and 21 at the end 16 of the rotor core. It will be seen that the openings in the pockets alternate between being directed radially inwardly and radially outwardly. The pockets at the other end 17 of the rotor are arranged in a similar manner except that the inwardly directed pockets 20 at the end 16 of the rotor communicate with the outwardly directed pockets 21 at the end 17 and vice versa.

By reference to Figure 1, it will be seen that the cooling medium inside chambers 14 and 15 will circulate through ducts 18 in the general direction indicated by arrows 24, that is, it will enter the ducts through pockets 20 and leave by way of pockets 21. Although it is not necessary to have an even number of ducts 18, an even number is preferred in order to have a uniform and balanced flow of the cooling medium through the rotor core in both directions. The number and size of ducts employed will be determined by the particular design of the rotor and by the degree of cooling desired while the shape and size of the pockets will depend on the duct used. Since the ducts 18 are defined by apertures in the laminations which form the rotor core, each lamination will readily conduct the heat generated therein to the medium passing through the ducts. Upon leaving the ducts by way of pockets 21 the hot medium enters the chambers 14 and 15 to come into contact with the end shields 3 and 4 which in turn transfer the heat absorbed by the medium to the air outside the machine. Circulation of air or an equivalent gaseous cooling medium between chambers 14 and 15 through ducts in the rotor will, therefore, provide an effective means of cooling the rotor in a totally enclosed dynamoelectric machine.

Under certain conditions, as for example when the ducts 18 are spaced relatively close to the shaft 8, it may be desirable to eliminate all of the inwardly directed pockets 20 and employ the outwardly directed pockets 21 only to impel the cooling medium through the ducts 18. In such an arrangement one end only of each duct 18 would terminate in an outwardly directed pocket and the other end thereof would communicate directly chamber 14 or 15. There would therefore be an alternate arrangement of outwardly directed pockets and open duct ends at each end of the rotor 6. The cooling medium within chambers 14 and 15 would now enter the ducts 18 through the ends thereof which are in direct communication with the chambers and be expelled from the outwardly directed pockets by centrifugal force. It is also within the scope of this invention to eliminate all of the outwardly directed pockets 21 and rely on the inwardly directed pockets 20 to impel the cooling medium through the ducts 18. This arrangement of pockets 20 may be used to advantage when the ducts 18 are located relatively close to the outer peripheral surface of the rotor core 9. Three distinctive arrangements of the pockets with respect to the ducts are therefore possible, one employing both outwardly and inwardly directed pockets, another employing outwardly directed pockets only and yet another employing inwardly directed pockets only.

Pockets 20 and 21 may be identical, formed individually from sheet stock such as steel and attached to an end lamination of the rotor by well known means such as welding. Alternatively, all the pockets at one end of the rotor core may be formed integral with the end lamination.

In certain types of dynamoelectric machines, it may be desirable to control the flow of the cooling medium within a chamber so as to obtain maximum heat transfer from the medium to the walls of the chamber. A baffle is shown in chamber 14, Figure 1, as comprising a cylindrical shell 35 fixed to end shield 3 at 37 as by welding and positioned such that it is concentric with shaft 8 and having its free end in close proximity to pockets 20 and 21. The periphery of shell 35 is perforated in the region 36 so as to allow the cooling medium to pass freely through the shell in this region only. Such a baffle directs the cooling medium expelled from pockets 21 into contact with end shield 3 before being permitted to pass through the baffle at 36 and on to pockets 20. A similar baffle may be provided inside chamber 15.

The type of pockets shown in Figures 1 and 2 would be unsuitable for use on a rotor having a winding which overhangs the ends of the rotor to any appreciable extent. Figure 3 illustrates a modified type of duct and pocket which may be applied to a wound rotor having a winding 26 which overhangs the end of rotor core 25 to about the same extent as winding 12. In order to avoid having the winding 26 cover the openings 23 of pockets 21, ducts 18 are extended beyond the end of the rotor core as shown at 31 and then turned in a direction away from shaft 8 to form a pocket 27 having an opening 28. This modification may comprise a tubular member bent at 32 through an angle of 90 degrees or less to form the pocket section 27 and extension 31, the open end of extension 31 being fixed to the end of core 25 so as to be in communication with duct 18 as shown in Figure 3. The desired rate of flow of the cooling medium through duct 18 will determine the length of the pocket section 27; the longer 27 is the greater will be the rate of flow for a given rotor r.p.m. In this modification, the pocket of the type indicated by 20 as being directed radially inwardly may be dispensed with as shown in Figure 3. One end only of each duct 18 now terminates in a pocket 27 which is directed radially outwardly and the other end of the duct communicates directly with a chamber 14 or 15. When viewing either end of the rotor 6, it will be seen that the duct ends terminating in pockets 27 and those which do not have a pocket alternate in their arrangement around the rotor core 25. Numeral 29 indicates the general direction of the flow of the cooling medium through 18, 31 and 27. Except for the differences pointed out in this paragraph with reference to Figure 3, the arrangement of elements and operation thereof is otherwise the same as that illustrated by Figures 1 and 2. It is to be noted that the practice of this invention lends itself most readily to dynamoelectric machines where both ends of the rotor are more or less exposed so as to accommodate the pocket members.

Since considerable heat may be transferred from the rotor and stator to the members enclosing these elements, it may be desirable to provide external ventilation such as a fan 33 mounted on shaft 8 for rotation therewith. A cowl 34 may also be provided to cooperate with fan 33 to direct a stream of air over the enclosure members 4, 2 and 3.

It is also within the scope of this invention to completely dispense with pockets 20 and 21. In such an arrangement the disposition of the ducts 18 relative to the shaft 8 would provide the means to cause a fluid flow through a duct due to rotation of the rotor 6. In Fig. 1 the ducts 18 are shown passing through the rotor core 9 in a direction generally parallel to the shaft 8. If a duct 18 passed through core 9 at an acute angle with respect to the axis of the shaft such that one end of said duct is much nearer to the axis of shaft 8 than the other end of the same duct, then rotation of rotor 6 would cause a fluid flow in the duct directed away from the axis of rotation. In other words the fluid would enter the duct at the end thereof closer to the axis of rotation and be expelled from the end farther from the axis. A fluid flow may be obtained in both axial directions by alternatnig the ducts. That is, the duct openings at one end of the rotor are arranged alternately adjacent the shaft and radially spaced therefrom. In certain applications of this invention, it may be desirable to employ such an arrangement of ducts and thereby dispense with the pockets.

By a novel arrangement of ducts and pockets, this invention provides an effective means of cooling the rotating element in a totally enclosed dynamoelectric machine by circulating the air or other cooling medium inside the enclosure of the machine through said rotating element and at the same time bringing the cooling medium into contact with the walls of the enclosure in order that heat absorbed by the medium may be transferred to the enclosure and dissipated therefrom to the atmosphere surrounding the machine.

In view of the above, it will be evident that many modifications and variations are possible in light of the above teachings. It therefore is to be understood that within the scope of the appended claim the invention may be practiced otherwise than as specifically described.

What we claim as new and desire to secure by Letters Patent of the United States is:

A totally enclosed dynamoelectric machine comprising a frame enclosing a stator and a rotor arranged for electrodynamic cooperation therewith, a shaft in said rotor supported in opposite ends of the frame, first and second closed chambers formed by those areas existing between the inner portions of the frame and the exposed stator and rotor surfaces on opposite sides of the machine, a plurality of axially disposed air ducts in said rotor having cup-shaped elements fixed to opposite ends thereof, the arrangement of said elements attached to the rotor in said first chamber being such that beginning with a selected duct the elements on one end alternate between facing radially outward and radially inward, and the arrangement of the elements attached to the rotor in the second chamber being such that beginning with said selected duct the elements alternate between facing radially inward and radially outward, and an axially disposed cylindrical member positioned around the shaft in one of said chambers and being equipped with intake openings adjacent the outer end of the chamber for receiving air discharged from the radially outward directed elements and cooled when passed in heat exchange relationship with the walls of the frame, an outlet in said cylindrical member having its opening positioned inwardly from the outward directed element and located to discharge cooled air into the inwardly directed elements, thereby causing circulation of air through the ducts toward the opposite end of the rotor.

References Cited in the file of this patent
UNITED STATES PATENTS

| | | |
|---|---|---|
| 700,335 | Keiley | May 20, 1902 |
| 2,043,655 | Ehrmann | June 9, 1936 |